United States Patent [19]

Cacciuttolo et al.

[11] Patent Number: 5,033,511
[45] Date of Patent: Jul. 23, 1991

[54] DEVICE FOR THE PRESSURE-SEALED OBTURATION OF A PORTION OF A PRIMARY DUCT OF A PRESSURIZED-WATER NUCLEAR REACTOR

[75] Inventors: Antoine Cacciuttolo, Saint-Priest; Claude Malaval, Antony, both of France

[73] Assignee: Framatome, Courbevoie, France

[21] Appl. No.: 459,409

[22] Filed: Dec. 29, 1989

[30] Foreign Application Priority Data

Dec. 29, 1988 [FR] France .................. 88 17437

[51] Int. Cl.[5] ............................ F16L 55/12
[52] U.S. Cl. .......................... 138/97; 138/89; 138/93; 138/98; 376/203; 376/451; 376/204; 165/71; 165/76
[58] Field of Search ........ 138/89, 90, 91, 93, 138/97, 98; 376/203, 204, 451; 165/71, 76; 220/232

[56] References Cited

U.S. PATENT DOCUMENTS 939,804  11/1909  Chersty ..................... 138/89
4,673,001  6/1987  Pajes ........................ 138/93

Primary Examiner—James E. Bryant, III
Attorney, Agent, or Firm—Pollock, Vande Sande & Priddy

[57] ABSTRACT

The device for pressure-sealed obturation comprises a flexible tubular casing (22) having an open end along the perimeter of which the casing constitutes an inflatable toric seal (30) and a base (22a) in the form of a glove finger on which there is fixed the end of a shaft (21) disposed at the central part of the casing (22). The shaft (21) passes through the base (22a) of the casing (22) in a sealed manner. The device also comprises a plate (38) for retaining the casing (22) comprising at least two parts articulated to one another as well as retention plate (41) for fixing the retaining plate (38) under the base (22a). Ring shaped elements (43) are retained against the toric seal (30) by an articulated spacing device (47).

8 Claims, 3 Drawing Sheets

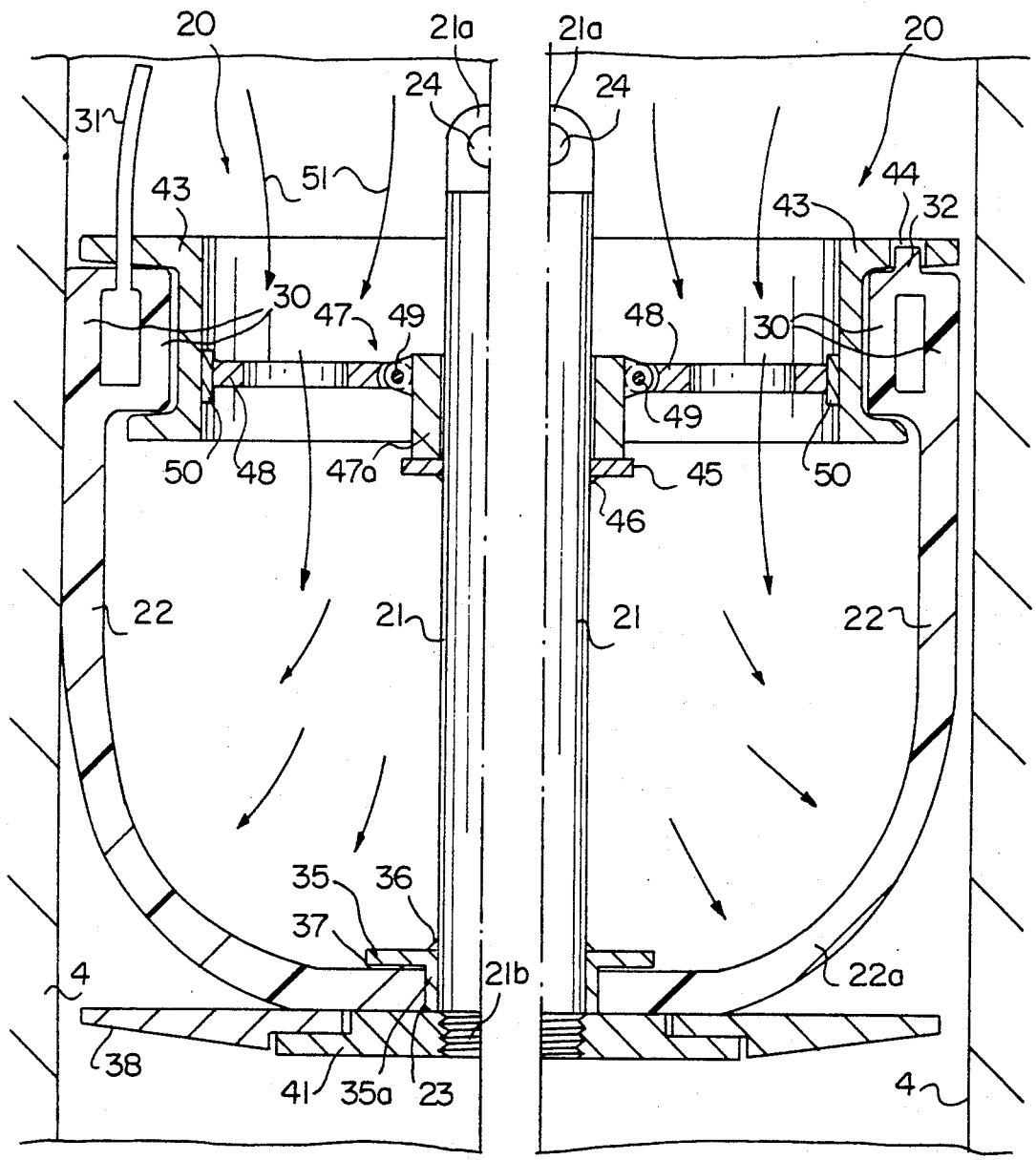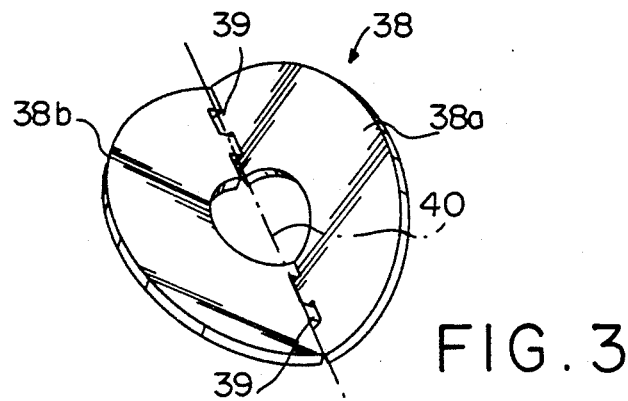

DEVICE FOR THE PRESSURE-SEALED OBTURATION OF A PORTION OF A PRIMARY DUCT OF A PRESSURIZED-WATER NUCLEAR REACTOR

FIELD OF THE INVENTION

The invention relates to a device for the pressure-sealed obturation of a portion of a primary duct of a pressurized-water nuclear reactor situated in the vicinity of a nozzle for connection to the water vessel of a steam generator.

BACKGROUND OF THE INVENTION

In order to prolong the service life of pressurized-water nuclear reactors, consideration is given to undertaking the complete replacement of one or more steam generators of the reactor, after a certain operating time, in the case where a certain number of tubes of the steam generator have suffered damage due to corrosion, to the impacts of particles transported by the primary fluid or to the thermal or mechanical stresses to which these tubes have been subjected in service.

The complete replacement of a steam generator, the water vessel of which comprises nozzles permitting the connection of the primary part of the steam generator to corresponding primary ducts of the nuclear reacator, requires cutting of the primary ducts in the vicinity of their points of connection with the nozzles, and then the precise positioning of the new steam generator and the welding of the nozzles of this new steam generator to the primary duct portions which have been cut away and premachined.

In order to carry out the operations of cutting away and of premachining of the connecting portions of the primary ducts, as well as the subsequent welding operations, it is neccessary to decontaminate the used water vessel of the steam generator and a portion of the primary ducts situated in the vicinity of the corresponding connecting nozzle of the steam generator.

To this end, use is made of an installation permitting the placing in circulation, in the water vessel and in each one of the portions of primary ducts close to the connecting nozzles, of a decontaminating reagent in liquid form which is recycled after decontamination in processing units disposed in the vicinity of the chamber of the steam generator.

To carry out this decontamination by circulation of liquid, it is necessary to isolate the portion of each one of the primary ducts which is situated in the vicinity of the nozzle for connection to the steam generator, by means of an obturating device which can be placed in position, from the interior of the water vessel of the steam generator, before carrying out the decontamination operation.

French Patent 2,602,853 contains a description of an obturator which can be placed within a duct and which consists of an inflatable balloon.

However, such a device exhibits disadvantages in the case of an application within the context of the decontamination of the water vessel of a steam generator.

In fact, it is difficult to construct a balloon the flexible casing of which is able to resist the pressure and temperature conditions experienced during the decontamination, as well as the corrosive action of the decontaminating liquid. The introduction of the balloon into the duct, although this balloon is not subjected to an internal pressure, may present difficulties to the extent that the balloon is liable to undergo a deformation reflected in a blocking in a curved part of the duct.

Moreover, in the case where the balloon has been correctly introduced, placed in position and inflated within the duct, it is liable to undergo, during the decontamination, a deformation under the effect of the pressure of the liquid which may be reflected in a loss of sealing and in the introduction of decontaminating liquid into the primary circuit of the reactor.

Patent Application EP-A-163,087 has likewise proposed an obturating plug exhibiting inflatable sealing elements and a structure for retention in support on the internal surface of the nozzle of the steam generator. The object of the obturator described in this patent application is to isolate the water vessel from the remainder of the primary circuit, which continues to be filled with water. In the case of the decontamination of the water vessel and of a portion of the primary ducts, the primary circuit is empty of water and the water vessel of the steam generator is supplied with decontaminating liquid under pressure: in consequence the device according to Patent Application EP-A-163,087 is not suitable for the case of the decontamination.

SUMMARY OF THE INVENTION

An object of the invention is therefore to propose a device for the pressure-sealed obturation of a portion of a primary duct of a pressurized-water nuclear reactor situated in the vicinity of a nozzle for connection to the water vessel of a steam generator, comprising a means for retention in support on the internal surface of the nozzle and a deformable flexible element providing the sealed closure of the duct, by placing the casing in contact with the internal wall of the duct, in the course of the filling of the water vessel by a pressurized fluid, it being possible for this device to be easily placed in position from the water vessel of the steam generator, within a duct of the primary circuit, in such a manner as to ensure a sealed and effective closure of this duct, irrespective of the pressure of the fluid introduced into the water vessel.

In order to achieve this object, the device according to the invention comprises:

a shaft comprising linkage means which are articulated to and removable from the retaining means at one of its ends, a flexible tubular casing comprising an open end along the perimeter of which the casing constitutes an inflatable toric seal and a base in the form of a glove finger on which there is fixed the end of the shaft opposite to its articulated linkage end, in such a manner that the shaft disposed at the central part of the casing passes through the base in a sealed manner, a plate for retaining the casing comprising at least two parts assembled to one another, the means for fixing the retaining plate under the base and outside the casing comprising a removable linking element at the end of the shaft passing through the casing and an element for supporting the retaining plate, at least two elements in the form of a ring portion having an external peripheral part in which the upper edge of the casing can be accommodated, and an articulated device for radial spacing and for retention of the ring portions against the edge of the casing comprising a central body traversed by an opening, the diameter of which is greater than the diameter of the shaft.

In order that the invention may be more clearly understood, a description will now be given by way of example with reference to the accompanying drawings, of the general framework of utilization of the obturating device according to the invention and of an embodiment of this obturating device.

FIGS. 2A and 2B are half-views, in cross-section through an axial plane of the device according to the invention.

FIG. 3 is a perspective view of the retaining plate in a partially folded-back position.

DESCRIPTION OF PREFERRED EMBODIMENT

Figure 1:
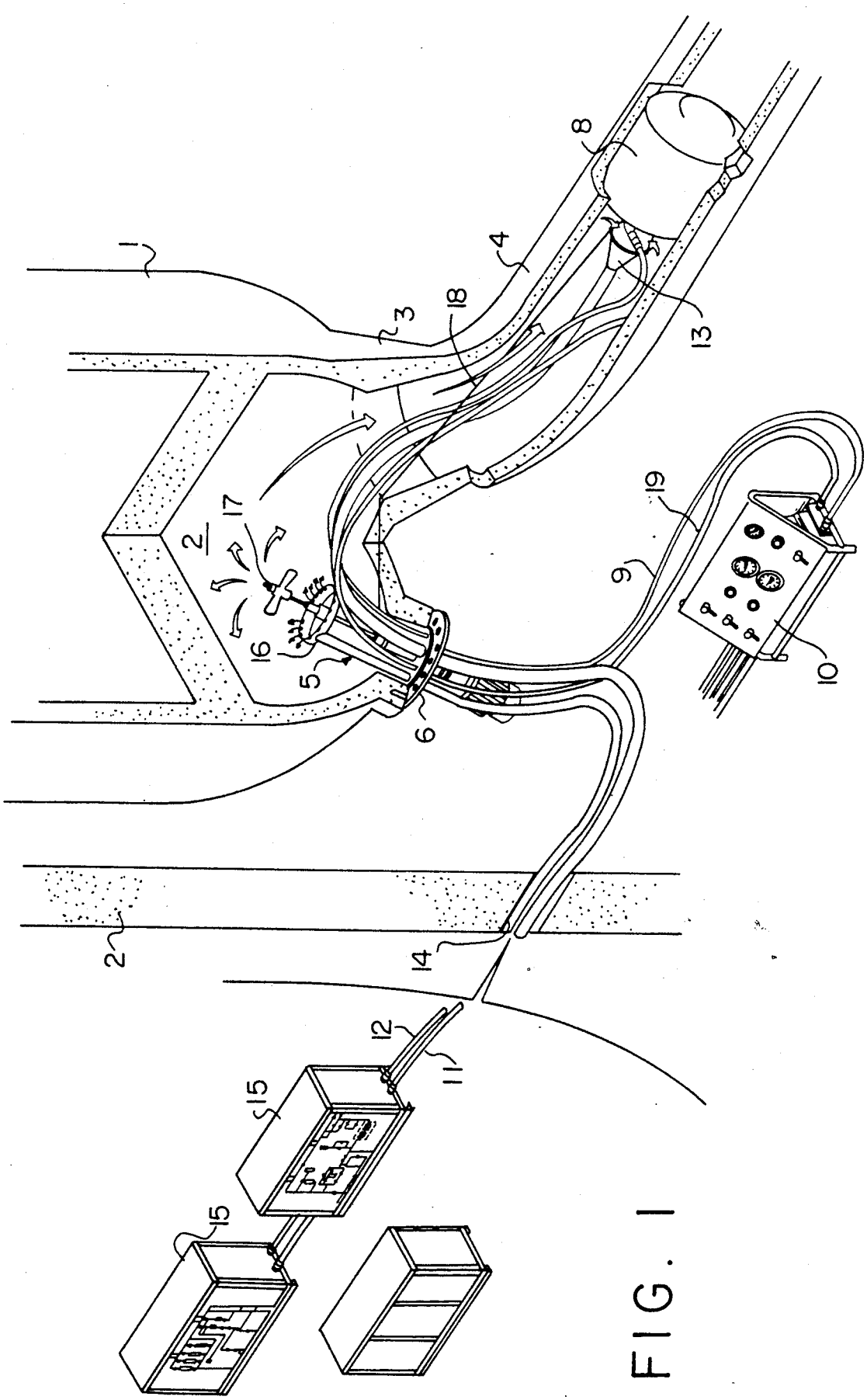
FIG. 1 is a perspective view, partly in section, of the lower part of a steam generator and of a primary duct portion, during a decontamination operation, the obturation of the primary duct being provided by a device according to the prior art.

FIG. 1 shows the base of a steam generator 1 disposed within a protective chamber, of which a part of the wall 2a has been shown. The lower part of the steam generator 1 consists of a water vessel 2 of substantially hemispherical shape, comprising at least two nozzles such as 3 permitting the connection of the primary part of the steam generator to a duct 4 of the primary circuit.

The water vessel 2 also comprises an inspection opening 5, the diameter of which is substantially smaller than the internal diameter of the primary duct 4.

During normal operation of the nuclear reactor, the inspection opening 5 is closed in a sealed manner by a plug.

In FIG. 1, the lower part of the steam generator 1 and the primary duct 4 have been represented during a decontamination operation which is necessary for the replacement of the used steam generator 1.

The plug of the inspection opening 5 is demounted and a device 6 for temporary closure and for retention of the decontamination tooling is fixed on the external entrance part of the inspection opening 5.

An obturating device according to the prior art, consisting of an inflatable balloon 8, has been introduced in the non-inflated state into the duct 4, and then pressurized by means of a compressed-air duct 9 connected to a service station 10 situated in the chamber of the steam generator.

The duct 9 passes in a sealed manner through the closing and retaining device 6 to be connected at its end to a valve for inflation of the balloon 8.

The closing and retaining device 6 is likewise traversed, in a sealed manner, by a duct 11 for the supply of reagent liquid for the decontamination of the water vessel 2 and by a duct 12 for the recovery of the contaminated liquid which has circulated in the water vessel 2 and in the portion of the duct 4 delimited by the obturator 8.

The recovery duct 12 is connected to a recovery bulb 13, the open the

T char nect

15

The next penetrating into the water vessel 2 to a tor introduction of the decontamination reagent liquid. A helix agitator 17 comprises a shaft situated along the axis of the torus connected, outside the water vessel, to a drive motor.

A cable 18 for retaining the obturator 8 is connected to the obturator 8 at one of its ends and to the support and closure device 6 at its other end.

The device 6 is likewise traversed in a sealed manner by a duct 19 supplied with rinsing water from the service station 10.

In the case where the obturating device 8 consists of an inflatable balloon, it may be awkward in certain circumstances, to introduce this inflatable balloon into the duct 4, from the water vessel 2, to the extent that the duct 4 has a certain curvature in its part close to the connecting nozzle 3; the obturator 8 may be deformed in such a manner as to be blocked before arriving in its service position where the casing is pressurized and effects the sealing by contact with the internal wall of the duct 4.

Furthermore, the obturating device 8 is subjected, on its face directed towards the water vessel 2; to the pressure of the active decontaminating liquid, this presents the risk of making the contact between the obturating device 8 and the internal surface of the duct 4 defective, so that the sealing is no longer provided and that decontaminating liquid runs the risk of spreading into the primary circuit of the nuclear reactor.

Figure 4:
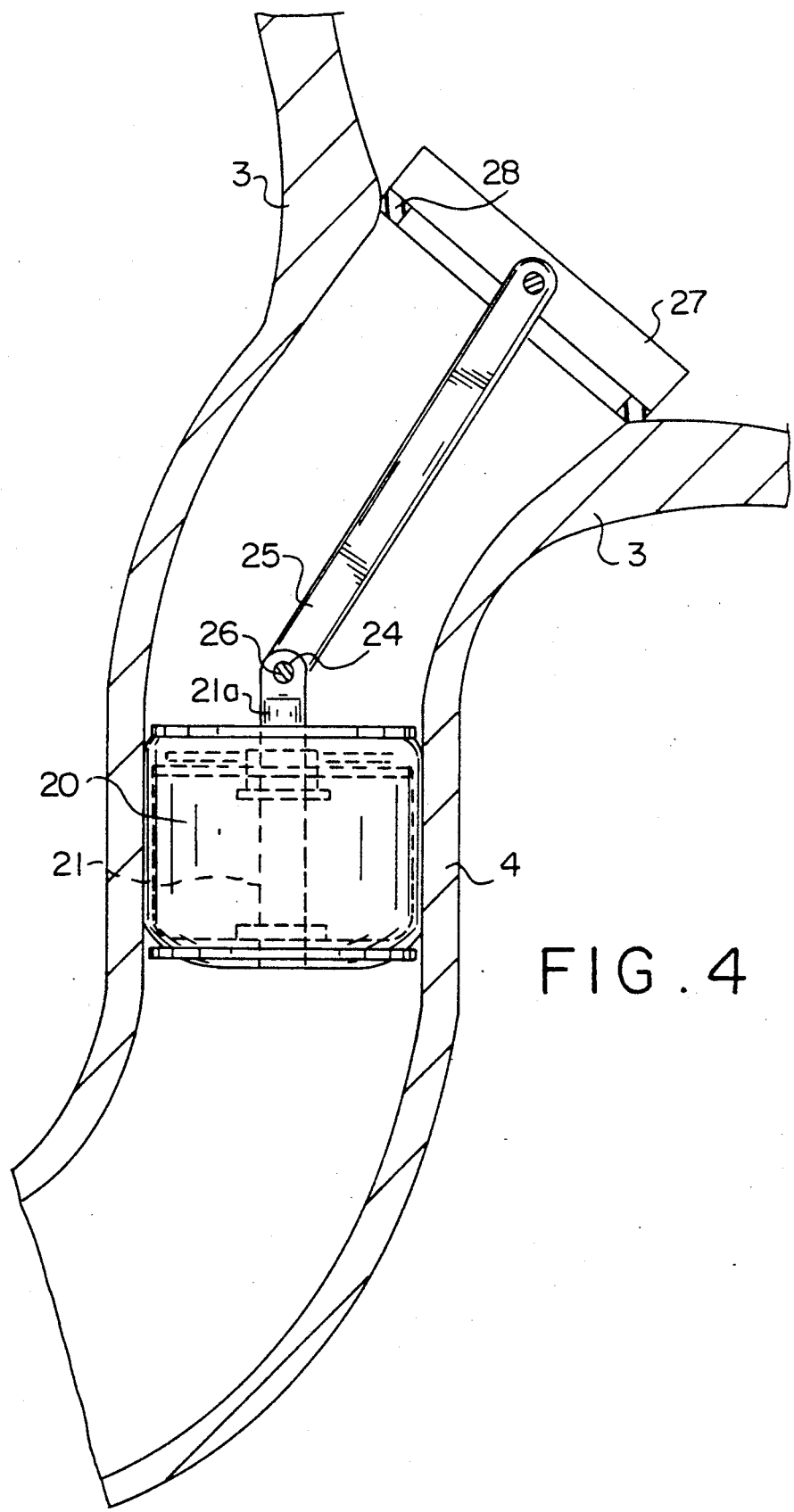
FIG. 4 is an axial cross-sectional view of the obturating device according to the invention in a portion of a primary duct of a pressurized-water nuclear reator.

FIGS. 2A and 2B, as well as FIG. 4, show an obturating device according to the invention which overcomes the disadvantages of the prior art device consisting of an inflatable balloon.

In FIG. 2A, the device has been shown after it has been positioned in the duct 4 and before a totally sealed contact is achieved between the external surface of the flexible casing of the device and the internal wall of the duct 4.

In FIG. 2B, the device has been shown in a configuration in which it provides the sealing by contact between the external wall of the flexible casing and the internal wall of the duct 4.

The obturating device 20 according to the invention comprises principally a central shaft 21 and a flexible casing 22.

The central shaft 21 consists of a cylindrical rod, one end 21a of which is machined to exhibit flats and to constitute a cap pierced by a hole 24.

As can be seen in FIG. 4, the end 21a of the shaft 21 may be connected in an articulated manner to a rod 25, via an articulation shaft 26 engaged into the hole 24 and into a corresponding hole of the rod 25, the articulation shaft 26 being perpendicular to the axis of the duct 4 when the device is in the service position.

The rod 25 is articulated at its end opposite to the linking cap 21a of the shaft 21 to a plug 27 supported on the internal surface of the nozzle 3 of the steam generator, via a supporting ring 28.

As can be seen in FIG. 4, the device 27, 28 for support on the nozzle 3 and the rod 25 ensure the retention the duct 4, in its opposite to the
21b.
n elastomer resis-
uid, has a tubular
2a in the form of a
t by an opening 23.
.ce to the base 22a is
open and comprises, .ry, a hollow toric part 30 obtained by molding with the casing 22 and constituting an inflatable seal.

The internal volume of the toric part 30 may be supplied with compressed air by a duct 31 ensuring the inflation of the seal to cause it to change from its configuration represented in FIG. 2A to its configuration represented in FIG. 2B.

The upper toric part 30 of the casing 22 likewise comprises one or more tenons 32 obtained by molding with the casing 2 and projecting in relation to the upper part of the casing.

An annular part 35 for sealed fixing of the shaft 21 on the casing 22 is fixed by a weld 36 on a part of the shaft 21 situated immediately above the threaded part 21b.

The annular part 35 comprises a collar 35a engaged into the hole 23 of the casing and its lower annular surface is affixed on the base of the casing 22 by a layer of adhesive 37. The threaded end 21b of the shaft 21 is slightly projecting towards the exterior in relation to the base 22a of the casing 22 when the end of the shaft 21 is fixed on the casing 22, via the part 35.

The obturating device according to the invention further comprises a plate 38 for retaining the casing 22 of the obturating device.

As can be seen in FIG. 3, the plate 38 in the form of a ring consists of two half-rings 38a and 38b which are connected to one another in an articulated manner by hinges 39, in such a manner that the axis of articulation 40 of the two half-rings 38a and 38b is situated in the plane of the half-rings and directed along a diameter. The hinges 39 permit the completed folding back of the plate 38, the half-rings 38a and 38b coming to be supported one against the other.

A supporting part 41 engaged into the central opening of the ring 38 and comprising a supporting shoulder permits the retention of the plate 38 in its deployed position as represented in FIG. 2A, the half-rings 38a and 38b then being in a same plane. The supporting part 41 comprises a threaded central bore which may be engaged by screwing on the threaded end 21b of the shaft 21 to ensure the retention of the plate 38. In the case where it is desired to reduce the total weight of the device, the supporting part 41 may be constituted by a plate with a radiating arm.

The obturating device according to the invention likewise comprises two elements in the form of ring portions 43, the meridian C-shaped profile of which is visible in FIGS. 2A and 2B. The toric seal 30 consisting of the upper part of the casing 22 may be at least partially accommodated within this C-shaped profile.

One of the rings comprises an opening for the passage of the tube for supplying the internal volume of the toric seal 30 with compressed air.

At least one of the rings 43 comprises a recess 44 permitting the reception of the projecting tenon 32 of the toric seal 30 to effect its retention when the obturating device is placed in position.

An abutment 45 of annular shape is fixed on the shaft 21, in a position defined by means of a welded seal 46.

The obturator according to the invention further comprises an articulated spacing device 47 comprising a central ferrule 47a, the internal diameter of which is greater than the diameter of the shaft 21 and three spacing arms 48 which can be placed at 120° around the ferrule 47a. Each one of the arms 48 is articulated at one of its ends by a shaft 49 on the ferrule 47a and comprises a supporting shoe 50 at its other end. The axes of articulation 49 are perpendicular to the axes of the ferrule 47a.

A description will now be given of the operations which are necessary for the positioning of the device according to the invention in a primary duct 4 of a nuclear reator and for the performance of the sealed closure of the duct.

At a first stage, the various parts constituting the obturating device according to the invention are introduced into the water vessel 2 of the steam generator through the inspection opening.

The assembly consisting of the shaft 21 and the casing 22 may easily be introduced through the inspection opening, although the diameter of the casing is greater than the diameter of the inspection opening, provided that the flexible casing can be easily folded back.

The other parts constituting the device represented in FIGS. 2A and 2B may likewise be introduced without difficulty within the water vessel through the inspection opening, with the exception of the support plate 38, which must be folded back along its fold line 40, the external diameter of the plate 38 being greater than the diameter of the inspection opening.

An operator located in the water vessel of the steam generator performs the unfolding of the plate 38 and its assembly at the end of the shaft 21 via the threaded support part 41.

The assembly consisting of the shaft 21, the casing 22 and the support plate 38 fixed at the end of the shaft 21 is introduced through the opening of the nozzle 3 opening into the water vessel. To facilitate the introduction and the movement of the obturating device 20 within the duct 4, the shaft 21 is connected at its articulated end 21a to the end of the rod 25.

A pre-inflation of the toric seal 30 and of the casing 22 is then carried out, in order to ensure its complete unfolding and its temporary retention in the duct 4.

It is then possible to demount the rod 25 after having driven the shaft 26 from the opening.

The two elements 43 in the form of half-rings are then placed at the internal periphery of the toric seal 30, as represented in FIGS. 2A and 2B. The retention of the half-rings 43 is provided by the projecting tenons 32 of the casing 22 accommodated in the openings 44 of the half-rings 43.

The spacing device 47 is placed in position, the central ferrule 47a being attached to the shaft 21 by its upper end until the moment when the ferrule 47a comes to rest on the abutment 45.

The articulated arms 48 are then brought back into a position perpendicular to the shaft 21, their shoes 50 being supported against the internal surface of the half-rings 43 to provide the retention thereof.

The inflation of the toric seal 30 is carried out by passing compressed air into the duct 31.

The obturating device is then in a position in which it provides the sealed closure of the desired portion of the duct 4 close to the nozzle 3.

It is then possible to carry out the decontamination by circulation of a pressurized active liquid, as described with reference to FIG. 1. The fluid in circulation (arrow 51) exerts a pressure within the casing 22 and thus force the casing 22 against the internal surface of the duct 4 with an effectiveness directly proportional to the pressure of the liquid.

The plate 38 provides the retention of the base 22a of the casing 22 in order to avoid excessive deformation of this casing, within the primary duct.

The obturating device is thus a pressure-sealed device.

The device is simple to use, exhibits a high degree of effectiveness in operation, and in particular provides sealing irrespective of the pressure of the decontaminating liquid.

The flexible casing may have a shape different from that which has been described and represented.

The plate for retaining this flexible casing, the diameter of which is greater than the diameter of the inspection opening, may consist of any number of parts which can be assembled after introduction of these constituent parts into the water vessel of the steam generator.

The means for fixing the retaining plate on the base of the casing and for linkage to the shaft may likewise be constructed in a different form.

The ring in which the upper toric seal of the casing is accommodated may consist of more than two elements, and the spacing device may comprise only two, or more than the articulated arms.

The articulated linkage between the shaft and the means for retention in the nozzle of the steam generator may be provided by means other than a cap in which a mounting shaft is engaged.

Finally, the obturating device according to the invention may be adapted to any diameter of primary duct and to any condition with regard to the pressure, the temperature and the chemical composition of the reagent decontaminating liquid employed.

We claim:

1. Device for pressure sealed obturation of a portion of a primary duct (4) of a pressurized water nuclear reactor located in the vicinity of a nozzle (3) for connection to a water vessel (2) of a steam generator, said device comprising
   (a) a flexible tubular casing (22) having an open end along a perimeter of which the casing constitutes an inflatable toric seal (30) and a base (22a) in the form of a glove finger, providing sealed closure of said duct (4) by placing said flexible tubular casing (22) in contact with an internal wall of said duct (4), in the course of filling of said water vessel (2) by pressurized fluid;
   (b) means (25, 27, 28) for retaining said flexible tubular casing (22), in support on an internal surface of said nozzle (3);
   (c) a shaft (21) having an end connected through articulated and removable means for linking (21a, 26) to said means (25, 27, 28) for retaining said flexible casing (22) and an opposed end (21b) passing through the base of the flexible casing (22) in a sealed manner and fixed to said base (22a) through a fixing means (41) removably connected to said opposed end (21b) of said shaft (21);
   (d) a plate (38) for retaining said casing and comprising at least two parts (38a, 38b) assembled to one another, fixed beneath said base (22a) and outside said casing and supported by said fixing means (41);
   (e) at least two elements (43) in the form of a ring portion having an external peripheral part in which said toric seal (30) of said casing (22) is housed; and
   (f) an articulated device (47) for radially spacing and retaining said ring portions (43) against said toric seal (30) of said casing (22), said articulated device comprising an annular central body (47a) threaded on said shaft (21) and radial arms (48) articulated on said central body (47a) at first ends thereof and connected at second ends thereof to one of said ring portions.

2. Obturating device according to claim 1, wherein said at least two parts (38a, 38b) of said plate (38) are in the form of half-rings assembled to one another and articulated via hinges (39) constituting a diametral fold line (40).

3. Obturating device according to claim 1, wherein the end of said shaft (21) passing through said casing (22) comprises a threaded part (21b), said fixing means (41) comprising a corresponding threaded part, for assembly of said fixing means (41) to said threaded part (21b) of said shaft (21).

4. Obturating device according to claim 1, wherein the end of said shaft (21) passing through said base (22a) of said flexible casing (22) is fixed to said base (22a) in a sealed manner via an annular piece (35) welded on said shaft (21) and adhesively bonded on said base around an opening (23) for the passage of said shaft (21) in a central position in said base (22a).

5. Obturating device according to claim 2, wherein said half-rings have an outwardly opening C-shaped meridian profile.

6. Obturating device according to claim 1, wherein said articulated spacing device (47) comprises a central ferrule (47a) having an internal bore with a diameter greater than the diameter of said shaft (21) and three radial arms (48) disposed at 120° to one another around said central ferrule via shafts (49) perpendicular to an axis of said bore of said ferrule and each comprising, at ends thereof opposite to ends thereof articulated on said central ferrule (47a), a shoe (50) for support on an internal surface of said elements in the form of ring portions (43).

7. Obturating device according to claim 6, wherein said shaft (21) comprises a support abutment (45) on which said central ferrule (47a) of said radial spacing device (47) comes to rest in the course of operation thereof.

8. Process for pressure-sealed obturation of a portion of a primary duct (4) of a pressurized-water nuclear reactor located in the vicinity of a nozzle (3) for connection of a water vessel (2) of a steam generator, said process comprising the steps of
   (a) introducing into said water vessel (2) of said steam generator, through an inspection opening (8), a flexible tubular casing (22) comprising an open end along the perimeter of which said casing (22) constitutes an inflatable toric seal (30) and a base (22a) in the form of a glove finger on which there is fixed an end of a shaft (21) disposed at a central part of said casing (22), in such a manner that said shaft (21) passes through said base (22a) in a sealed manner, a plate (38) for retaining said casing (22) and comprising at least two parts assembled to one another, means (41) for fixing said retaining plate (38) under said base (22a) of said casing (22) comprising a removable linking element at said end of said shaft (21) passing through said casing (22), at least two elements (43) in the form of a ring portion having an external peripheral part accommodating said toric seal (30), and an articulated device (47) for radial spacing and retention of said ring portions (43) comprising a central body (47a) traversed by an opening having a diameter greater than a diameter of said shaft (21);
   (b) assembling and unfolding said parts (38a, 38b) of said plate (38) within said water vessel, and assembling said plate (38) via said fixing means (41) at the end of said shaft (21) which projects in relation to said base (22a) of said casing (22);

(c) introducing, from an interior of said water vessel (2), said flexible casing (22) assembled to said shaft (21) and to said retaining plate (38), within said primary duct (4), said plate (38) and said base (22a) being introduced in a first state into said duct, until a time when said casing (22) occupies a service position of said obturating device (20) in said duct (4);

(d) pre-inflating said toric seal (30) and said casing (22) by blowing in a gas under pressure;

(e) positioning said elements (43) in the form of ring portions on said toric seal (30);

(f) fastening said central body (47a) of said spacing device (47) on said shaft (21) until a time when said means (48) for spacing said spacing device (47) are located in a position facing said elements (43) in the form of ring portions;

(g) positioning said spacing devices (48), by radial extension, in such manner that they come to be supported on said elements (43) in the form of ring portions to retain said elements against said toric seal (30);

(h) inflating said toric seal (30) to a desired pressure; and (i) connecting the end (21a) of said shaft (21) opposite to the end of said shaft (21) which is connected to said base (22a) to a retaining device (25, 27, 28) placed in support against an internal surface of a nozzle (3) of said steam generator.

* * * * *